United States Patent
Woo

(10) Patent No.: US 9,665,977 B2
(45) Date of Patent: May 30, 2017

(54) APPARATUS AND METHOD FOR CONTROLLING RENDERING QUALITY

(71) Applicant: Samsung Electronics Co., Ltd., Suwon-si (KR)

(72) Inventor: Hyun-Jae Woo, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 112 days.

(21) Appl. No.: 14/668,248

(22) Filed: Mar. 25, 2015

(65) Prior Publication Data

US 2016/0063760 A1 Mar. 3, 2016

(30) Foreign Application Priority Data

Aug. 27, 2014 (KR) ........................ 10-2014-0112308

(51) Int. Cl.
*G06T 17/20* (2006.01)
*G06T 1/20* (2006.01)
*G06T 15/00* (2011.01)

(52) U.S. Cl.
CPC ................ *G06T 17/20* (2013.01); *G06T 1/20* (2013.01); *G06T 15/005* (2013.01); *G06T 2200/28* (2013.01); *G06T 2210/36* (2013.01); *G06T 2215/16* (2013.01)

(58) Field of Classification Search
CPC ....... G06T 15/005; G06T 15/04; G06T 17/20; G06T 11/203; G06T 2200/28; G06T 11/001; G06T 15/00; G06T 15/503; G06T 15/60; G06T 2210/08; G06F 1/3203; G06F 1/206; G06F 1/3225; G06F 1/324; G06F 1/3265; G06F 1/3296; G06F 2209/501; Y02B 60/1214; Y02B 60/1217; Y02B 60/1242; Y02B 60/1275
See application file for complete search history.

(56) References Cited

U.S. PATENT DOCUMENTS

| | | | |
|---|---|---|---|
| 5,428,718 A | 6/1995 | Peterson et al. | |
| 5,977,977 A * | 11/1999 | Kajiya | ................. G06T 11/001 345/418 |
| 6,333,746 B1 * | 12/2001 | Vaswani | ................. G06T 15/04 345/428 |
| 8,102,398 B2 | 1/2012 | Bajic et al. | |
| 8,253,722 B2 | 8/2012 | Woo et al. | |
| 8,373,702 B2 | 2/2013 | Falchetto | |
| 8,593,463 B2 | 11/2013 | Jarrett et al. | |
| 2003/0210271 A1 | 11/2003 | King | |
| 2007/0219644 A1* | 9/2007 | Sonobe | ................... G06F 1/206 700/12 |
| 2007/0288769 A1* | 12/2007 | Chang | ..................... G06F 1/206 713/300 |
| 2008/0055311 A1 | 3/2008 | Aleksic et al. | |
| 2008/0055335 A1 | 3/2008 | Jung et al. | |
| 2008/0266286 A1* | 10/2008 | Ramey | ................. G06T 15/005 345/419 |
| 2010/0002000 A1* | 1/2010 | Everitt | ................. G06T 15/503 345/426 |

(Continued)

*Primary Examiner* — Sultana M Zalalee
(74) *Attorney, Agent, or Firm* — Onello & Mello, LLP

(57) ABSTRACT

Provided is an apparatus and method for controlling rendering quality. The method for controlling rendering quality includes a thermal sensor sensing a temperature of a chip, a hull shader determining a level of detail (LOD) based on the temperature; and a tessellator tessellating segments that are divided according to the level of detail.

20 Claims, 17 Drawing Sheets

(56) References Cited

U.S. PATENT DOCUMENTS

| | | |
|---|---|---|
| 2012/0274641 A1 | 11/2012 | Diard |
| 2013/0120380 A1* | 5/2013 | Kallio .................. G06T 15/005 345/421 |
| 2013/0257891 A1 | 10/2013 | Sathe et al. |
| 2014/0320523 A1* | 10/2014 | Hodsdon ................ G06T 17/20 345/611 |

* cited by examiner

APPARATUS AND METHOD FOR CONTROLLING RENDERING QUALITY

CROSS-REFERENCE TO RELATED APPLICATIONS

This application claims priority under 35 USC §119 to Korean Patent Application No. 10-2014-0112308, filed on Aug. 27, 2014, in the Korean Intellectual Property Office, the disclosure of which is herein incorporated by reference in its entirety.

BACKGROUND

1. Technical Field

The present inventive concepts relate to an apparatus and method for controlling rendering quality. In particular, the inventive concepts relate to controlling rendering quality based on a temperature of an integrated circuit ("chip").

2. Description of the Related Art

A Graphics Processing Unit (GPU) is a core that exclusively handles the graphics operations in a computing system. A graphics pipeline is a hardware configuration of the GPU that receives a three-dimensional (3D) object as an input and provides a two-dimensional (2D) rendering image as an output. Recently, the trend towards an increase of graphics resolution causes an abrupt increase of GPU operations and required memory bandwidth.

Furthermore, recent GPUs increase the rendering quality of graphics while supporting tessellation. However, the support for tessellation further increases the GPU operations and required memory bandwidth very significantly, thus greatly reducing the frame rate Because the resulting reduction in frame rate deteriorates the user experience, methods to prevent this reduction are required. To prevent the reduction in frame rate there have been attempts to reduce an operation amount such that the tessellation level of a nearby object is heightened and the tessellation level of a distant object is lowered.

SUMMARY

The present inventive concepts described herein provide for apparatuses and methods for controlling rendering quality, which substantially reduces or prevents a reduction in frame rate.

Additional advantages, subjects, and features of the inventive concepts are set forth in part in the description which follows and in part will become apparent to those having ordinary skill in the art upon examination of the following or may be learned from practice of the invention.

In one aspect of the present inventive concept, there is provided a method for controlling rendering quality, comprising a thermal sensor sensing a temperature of a chip, a hull shader determining a level of detail (LOD) based on the temperature; and a tessellator tessellating segments that are divided according to the level of detail.

The sensing the temperature of the chip comprises determining which of at least one predetermined level the sensed temperature belongs to.

The sensing the temperature of the chip comprises determining whether the temperature of the chip belongs to a level that is equal to or higher than a threshold value of the chip.

An input signal of the hull shader includes a plurality of levels, and the determining the level of detail comprises the hull shader receiving an input of all the plurality of levels if the temperature is lower than the threshold temperature, and receiving an input of any one of the plurality of levels if the temperature is equal to or higher than the threshold temperature.

The plurality of levels are divided according to a size with which the segments are divided, and the determining the level of detail comprises the hull shader receiving the input of all the plurality of levels if the temperature is lower than the threshold temperature, and receiving only the level with which the divided segment is largest among the plurality of levels if the temperature is equal to or higher than the threshold temperature.

The determining the level of detail comprises the hull shader determining a first-order level of detail; and determining the first-order level of detail as the level of detail if the temperature is lower than the threshold temperature, and determining one of a preset maximum level of detail and the first-order level of detail, which has a smaller value than the value of the preset maximum level of detail, as the level of detail if the temperature is equal to or higher than the threshold temperature.

The determining the level of detail comprises the hull shader determining a first-order level of detail; and determining the first-order level of detail as the level of detail if the temperature is lower than the threshold temperature, and determining a value that is obtained by subtracting a reduction value from the first-order level of detail as the level of detail if the temperature is equal to or higher than the threshold temperature.

The reduction value is predetermined.

The reduction value is determined by a difference between the temperature and the threshold temperature.

In another aspect of the present inventive concept, there is provided a method for controlling rendering quality, comprising a thermal sensor sensing a temperature of a chip, and a graphics processing unit performing rendering based on the temperature.

The performing the rendering comprises performing tessellation based on a first level of detail if the temperature is lower than a threshold temperature, and performing tessellation based on a second level of detail that is lower than the first level of detail if the temperature is equal to or higher than the threshold temperature.

The performing the rendering comprises performing texturing based on a first texture level of detail if the temperature is lower than a threshold temperature, and performing texturing based on a second texture level of detail that is lower than the first texture level of detail if the temperature is equal to or higher than the threshold temperature.

The performing the rendering comprises performing the rendering with a first resolution if the temperature is lower than a threshold temperature, and performing the rendering with a second resolution that is lower than the first resolution if the temperature is equal to or higher than the threshold temperature.

The performing the rendering comprises performing anti-aliasing (AA) with a first extended multiple if the temperature is lower than a threshold temperature, and performing the anti-aliasing (AA) with a second extended multiple that is smaller than the first extended multiple if the temperature is equal to or higher than the threshold temperature.

The performing the rendering comprises performing texture filtering in a first mode if the temperature is lower than a threshold temperature, and performing the texture filtering in a second mode in which an operation amount is smaller than an operation amount in the first mode if the temperature is equal to or higher than the threshold temperature.

A device for controlling rendering quality comprises a central processing unit (CPU) configured to generate a mesh describing the surface of a three-dimensional (3D) object. The mesh comprises a plurality of primitives, wherein each primitive includes at least one vertex. A sub-graphic system is configured to receive the mesh from the CPU, and to render a display of a 3D object from the mesh. A rendering quality of the display is determined by at least a temperature measurement provided to a rendering quality state machine.

Alternative embodiments of the device for controlling rendering quality include one of the following features, or any combination thereof. The rendering quality state machine is included in the sub-graphic system. The rendering quality state machine is included in the CPU. The rendering quality of the display is determined by at least one of a tessellating level of detail, a texturing level of detail, a frame buffer resolution, an extended multiple of anti-aliasing, a texture filtering mode and a filtering ratio. The display of the 3D object includes a plurality of fragments, each fragment including a texture and a shading.

The subjects to be solved by the present inventive concept are not limited to the above-described subjects, and further subjects that have not been mentioned could be clearly understood by those skilled in the art from the following description.

BRIEF DESCRIPTION OF THE DRAWINGS

The foregoing and other features and advantages of the inventive concepts will be apparent from the more particular description of preferred embodiments of the inventive concepts, as illustrated in the accompanying drawings in which like reference characters refer to the same parts throughout the different views. The drawings are not necessarily to scale, emphasis instead being placed upon illustrating the principles of the inventive concepts. In the drawings.

DETAILED DESCRIPTION

Figure 1:
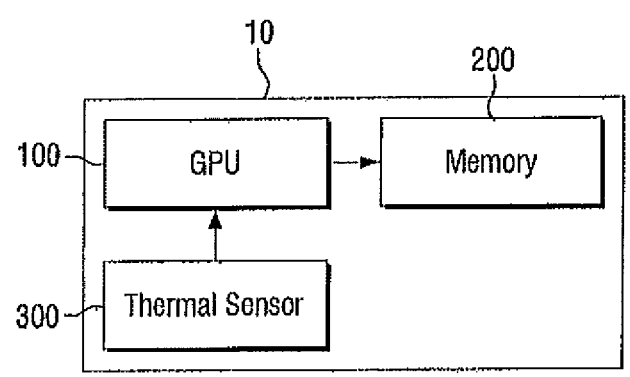
FIG. 1 is a block diagram showing a computing system for controlling rendering quality according to an embodiment of the present inventive concept.

Advantages and features of the present inventive concepts and methods of accomplishing the same may be understood more readily by reference to the following detailed description of preferred embodiments and the accompanying drawings. The present inventive concepts may, however, be embodied in many different forms and should not be construed as being limited to the embodiments set forth herein. Rather, these embodiments are provided so that this disclosure will be thorough and complete and will fully convey the inventive concepts to those skilled in the art, and the present inventive concepts will only be defined by the appended claims. Like reference numerals refer to like elements throughout the specification.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present inventive concept.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Hereinafter, referring to FIG. 1 through FIG. 5, a computing system including a GPU to which a method for controlling rendering quality according to an embodiment of the present inventive concept is applied will be described.

Referring to FIG. 1, a computing system to which a method for controlling rendering quality according to an embodiment of the present inventive concept is applied includes a GPU 100, a memory 200, and a thermal sensor 300.

The GPU 100, the memory 200, and the thermal sensor 300 may be positioned physically adjacent to at least one of the GPU 100, the memory 200 and the thermal sensor 300. For example, the GPU 100, the memory 200, and the thermal sensor 300 may be positioned on one chip 10, but are not limited thereto. The term "chip" refers to an integrated circuit. In one embodiment, the chip is a monolithic silicon chip. In another embodiment, the chip is a multi-chip module. Other various to the term "chip" are envisioned within the scope of this disclosure, whose temperature is used to control rendering quality. The GPU 100 and the thermal sensor 300 may be positioned on the same chip and the memory 200 may be separately positioned. Further, the graphics processing unit 100, the memory 200, and the thermal sensor 300 may be respectively positioned on different chips.

If the thermal sensor 300 can sense the temperature of the chip 10 according to the operation of the GPU 100, the positions of the GPU 100, the memory 200, and the thermal sensor 300 are not specially limited.

The graphics processing unit 100 is configured to perform tile-based rendering by including a graphics pipeline configuration. Accordingly, the graphics pipeline may also be called a rendering pipeline. The graphics pipeline configuration can process multiple streams of graphical data in parallel. The graphics pipeline may be implemented entirely in hardware, entirely in software or a combination thereof.

The memory 200 is configured to store data. The memory 200 may store graphic data that is processed by the GPU 100 or may store graphic data that is provided to the graphics processing unit 100. Furthermore, the memory 200 may serve as an operating memory of the GPU 100. The memory 200 may include at least one volatile memory, such as a DDR SDRAM (Double Data Rate Static DRAM) or SDR SDRAM (Single Data Rate SDRAM), at least one nonvolatile memory, such as EEPROM (Electrical Erasable Programmable ROM) or a flash memory, or a combination of volatile and nonvolatile memories.

In one embodiment, the thermal sensor 300 may sense the temperature of the GPU 100 as an indirect measurement of the temperature of the chip 10. The thermal sensor 300 may be positioned on the chip 10. The thermal sensor 300 may sense the temperature of the GPU 100 and may transfer the sensed temperature to the GPU 100. The thermal sensor 300 may be an on-chip thermal sensor.

The thermal sensor 300 may have a plurality of temperature levels. That is, the thermal sensor 300 may determine which level the sensed temperature of the chip 10 belongs to among various predetermined temperature levels. The various levels may be a plurality of temperature levels. In this case, the thermal sensor 300 may determine whether the temperature of the chip 10 belongs to the level that is equal to or higher than a threshold temperature of the chip 10.

The threshold temperature is defined as an interrupt temperature of the chip 10. The interrupt temperature is a reference temperature at which the reliability of the chip 10 begins to deteriorate or causes damage to the chip 10. When the interrupt temperature is reached, steps are taken to stop the operation of the chip 10 to prevent further or lasting damage.

Figure 2:
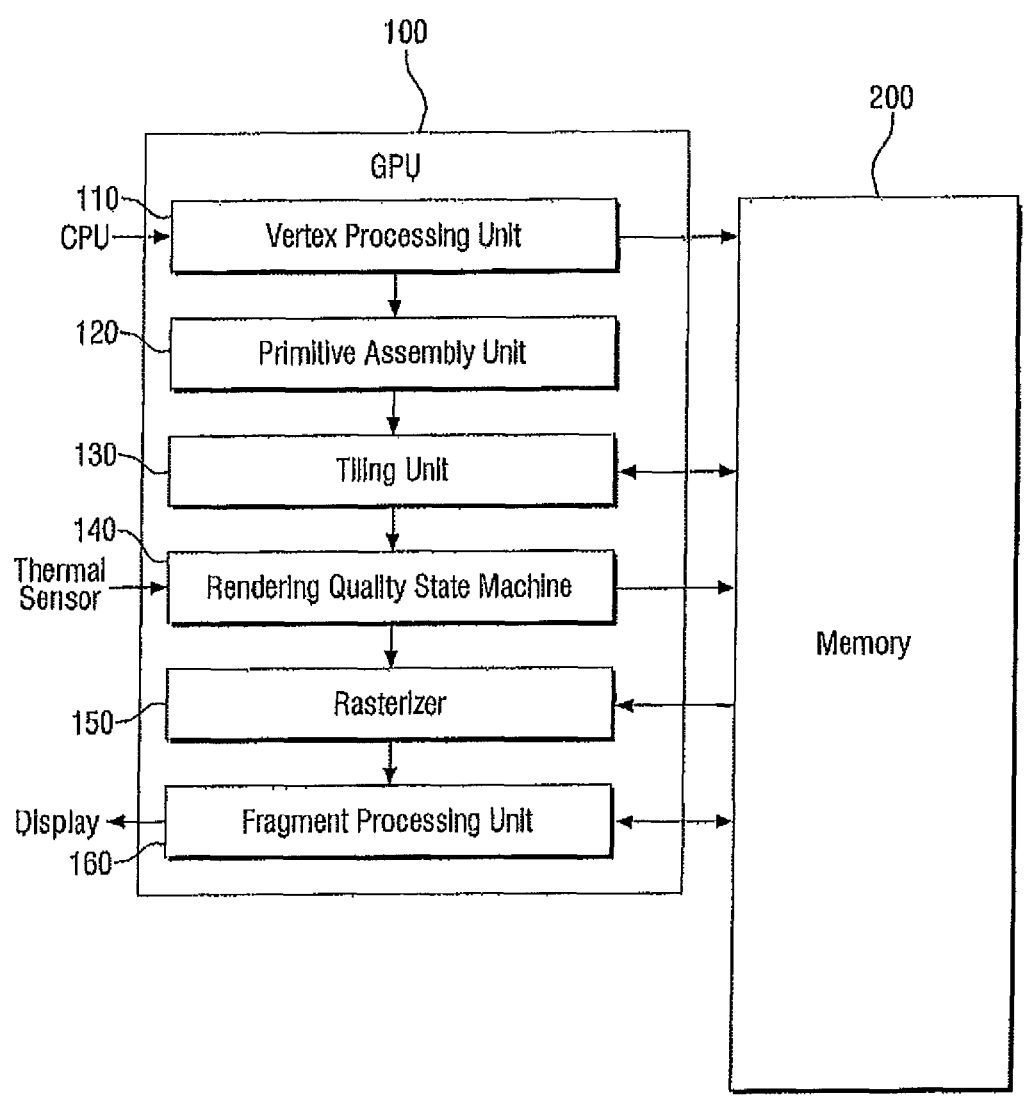
FIG. 2 is a block diagram showing a configuration of a graphics pipeline of a graphics processing unit of FIG. 1.

Referring to FIG. 2, the GPU 100 includes a vertex processing unit 110, a primitive assembly unit 120, a tiling unit 130, a rendering quality state machine 140, a rasterizer 150, and a fragment processing unit 160.

The vertex processing unit 110 is configured to convert a received input of a vertex, and to output the converted vertex. The vertex may be provided from a central processing unit (CPU). The vertex processing unit 110 is configured to receive and output a single vertex. For example, the vertex may include properties, such as a position, normal vector, and color value, but is not limited thereto. The position property of the vertex may be provided as coordinates of a three-dimensional (3D) space. For example, the position property of the vertex may include x coordinates, y coordinates, and z coordinates. The x coordinates may be horizontal coordinates, the y coordinates may be vertical coordinates, and the z coordinates may be depth coordinates. The vertex processing unit 110 may convert an object space vertex into a clip space vertex. Specifically, the vertex processing unit 110 may convert the object space vertex into a world space vertex, the world space vertex into a camera space vertex, and the camera space vertex into the clip space vertex.

The primitive assembly unit 120 is configured to receive the clip space vertex and to generate and output a primitive. The primitive assembly unit 120 may generate a primitive that is composed of at least one vertex. For example, the primitive assembly unit 120 may generate a triangle type primitive that is composed of three vertexes. Hereinafter, embodiments of the present inventive concept will be described using the triangle type primitive. However, the present inventive concept is not limited thereto, but may be applied to other types of primitives, (e.g. point, line, or quad type primitives), in the same manner. The primitive may include properties of connection information. The connection information may indicate the order for connecting the vertexes that constitute the primitive (in clockwise or counterclockwise direction). In accordance with values of the connection information, the front face and the back face of the primitive can be discriminated from each other.

The tiling unit 130 may be configured to receive an input of the primitive and to generate and output a primitive list. Hereinafter, referring to FIG. 3, the tiling unit 130 according to an embodiment of the present inventive concept will be described in more detail.

Figure 3:
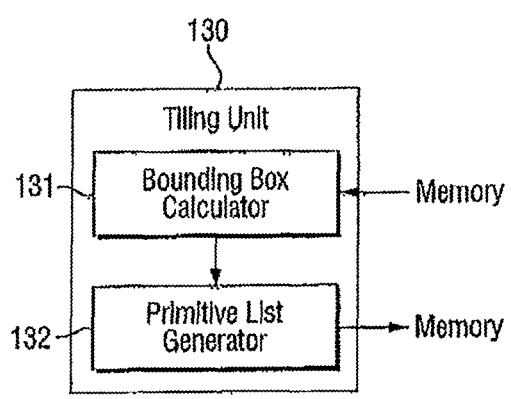
FIG. 3 is a block diagram showing a configuration of a tiling unit of FIG. 2.

First, referring to FIG. 3, the tiling unit 130 may include a bounding box calculator 131 and a primitive list generator 132.

The tiling unit 130 may divide an image frame to be rendered into a plurality of tiles. Each tile may be composed of a plurality of pixels or fragments that are included in the image frame. Further, the tiling unit 130 may divide each tile into a plurality of sub-tiles that are smaller than the tile.

The tiling unit may approximately determine which tiles the primitive touches through tile binning of the input primitive. For a primitive to be deemed as touching the tile, at least a partial region of the primitive must belong to the interior of the corresponding tile. Furthermore, the tiling unit 130 may allocate the primitive that touches the tile to the primitive list for the corresponding tile. The graphics pipeline may perform rendering with respect to the respective tiles to complete the rendering with respect to the whole image frame.

For this, the bounding box calculator 131 may calculate a bounding box that forms a boundary of the primitive. For example, in the case of a triangle type primitive, the bounding box calculator 131 may calculate the bounding box using the maximum value and the minimum value of x coordinates and y coordinates of three vertexes that constitute the primitive. On the other hand, in some embodiments of the present inventive concept, a 3D bounding box may be calculated. In this case, the bounding box calculator 131 may calculate the 3D bounding box using the x coordinates, y coordinates, and z coordinates of the primitive. For example, in the case of the triangle type primitive, the bounding box calculator 131 may calculate the 3D bounding box using the maximum value and the minimum value of the x coordinates, y coordinates, and z coordinates of the three vertexes that constitutes the primitive.

The primitive list generator 132 may generate and output a primitive list for each tile to the memory 200. The primitive list that is output and stored in the memory 200 as described above may be used in a rasterizer 150 to be described later.

The rendering quality state machine 140 may receive temperature information from the thermal sensor 300. The rendering quality state machine 140 may determine the rendering quality based on the temperature.

The rendering quality may be determined by various elements. For example, the rendering quality may be determined by a tessellating level of detail (LOD). Specifically, if the LOD is low, the rendering quality may be correspondingly low, thus reducing the number of required operations.

The rendering quality may be determined by a texturing LOD. For example, if the texture LOD is low, the rendering quality may become low, and thus reducing the number of required operations.

The rendering quality may also be determined by resolution of a frame buffer object (FBO). Specifically, if the resolution of the frame buffer object is low, the rendering quality may become low, and thus reducing the number of required operations.

The rendering quality may also be determined by an extended multiple of anti-aliasing (AA). Specifically, if the extended multiple of the anti-aliasing is low, the rendering quality may become low, and thus reducing the number of required operations.

The rendering quality may also be determined by a texture filtering mode. Specifically, if an operation amount is small in the texture filtering mode, the rendering quality may become low, and thus reducing the number of required operations.

The rendering quality may also be determined by a filtering ratio of texture filtering. Specifically, if the filtering ratio of texture filtering is low, the rendering quality may become low, and thus reducing the number of required operations.

The rendering quality state machine 140 may determine the rendering quality based on the temperature, and may update the GPU rendering quality state of the GPU 100.

For the updated GPU rendering quality, at least one of the tessellating level of detail, the texturing level of detail, the resolution of the frame buffer object, the extended multiple of the anti-aliasing, the texture filtering mode, and the filtering ratio of the texture filtering, are updated. The rasterizer 150 may convert a primitive into a fragment by performing rasterization of the primitive. Hereinafter, referring to FIG. 5, the operation of the rasterizer 150 will be described in more detail.

Figure 4:
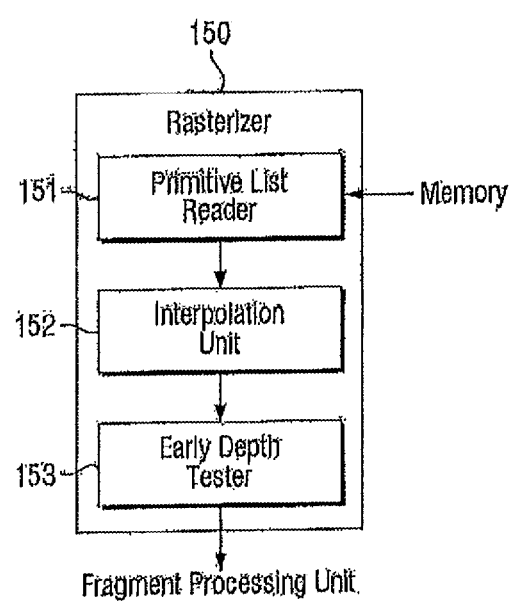
FIG. 4 is a block diagram showing a configuration of a rasterizer of FIG. 2.

FIG. 4 is a block diagram explaining the detailed configuration of the rasterizer of FIG. 2.

Referring to FIG. 4, the rasterizer 150 may include a primitive list reader 151, an interpolation unit 152, and an early depth tester 153.

The primitive list reader 151 may read the primitive list for each tile from the memory 200. Specifically, the primitive list reader 151 may receive an input of primitives that belong to each tile according to the rendering order.

The interpolation unit 152 may generate a set of fragments using the primitives provided through the primitive list reader 151. In one embodiment, the fragment includes three-dimensional (3D) dots that constitute the interior of the primitive. Respective fragments may correspond to respective pixels of an image frame. Specifically, the x coordinates and y coordinates of the fragment may be aligned to a pixel-grid of a 2D screen. The interpolation unit 152 may determine positions of fragments, normal vectors, and color values through interpolation of values of vertexes that constitute the primitive. For example, the position properties of the fragments may include x coordinates, y coordinates, and z coordinates substantially in the same manner as the position properties of the vertexes. Among them, the z coordinates may indicate the depth value of the fragment.

The early depth tester 153 may perform early depth test of the fragment level for each tile. The early depth test determines the visibility of fragments that belong to the interior of the corresponding tile, to determine visible fragments to be displayed on the image frame of which the rendering is completed, and to discard the data of invisible fragments.

The early depth tester 153 may determine the maximum depth value and the minimum depth value of the fragments that belong to the interior of the corresponding tile according to the result of the test. The early depth tester 153 may determine the visibility of the fragment through comparison of the depth value of the tile with the depth value of the fragment. Unlike the maximum depth value and the minimum depth value of the in the tiling stage, the maximum depth value and the minimum depth value among the depth values of the fragments that belong to the interior of the corresponding tile may be allocated as the maximum depth value and the minimum depth value respectively of the tile in the rasterization stage. If the depth value of the fragment is larger than the maximum depth value of the tile, the early depth tester 153 may determine that the corresponding fragment is an invisible fragment. On the other hand, if the depth value of the fragment is smaller than the maximum depth value of the tile, the early depth tester 153 may determine the corresponding fragment as a visible fragment. In the case where the fragment having the maximum depth value of the tile is replaced by the fragment having the same x coordinates and y coordinates, and having the depth value that is smaller than the maximum depth value of the tile, the early depth tester 153 may update the maximum depth value of the tile with the depth value of the fragment.

The rasterizer 150 may perform anti-aliasing to prevent the occurrence of an aliasing phenomenon that appears as a stair-step shape due to the limited resolution when an image is enlarged. Specifically, the anti-aliasing performed by the rasterizer 150 converts the stair-step shape of the rasterized image into a smooth straight-line shape.

When the temperature of the chip 10 is lower than a threshold temperature of the chip 10, the rasterizer 150 can normally perform the anti-aliasing. However, if the temperature is equal to or higher than the threshold temperature, the extended multiple of the anti-aliasing can be reduced.

Because the anti-aliasing effectively enlarges the pixels so that the pixels become smooth, both the precision and the number of operations increase as the enlargement ratio of the pixels increases. Accordingly, by reducing the extended multiple of the anti-aliasing, the number of operations of the GPU 100 can be reduced.

In some embodiments, rather than using only the threshold temperature to determine a reference, a plurality of temperature levels are used to change the extended multiple according to the determined plurality of temperature levels.

Referring again to FIG. 2, the fragment processing unit 160 may receive an input of fragments and may perform hidden surface elimination, lighting, surface shading, and texture mapping with respect to the input fragments. The fragment processing unit 160 may output an image frame, for which the rendering has been completed, to the display. Hereinafter, referring to FIG. 5, the fragment processing unit 160 will be described in detail.

Figure 5:
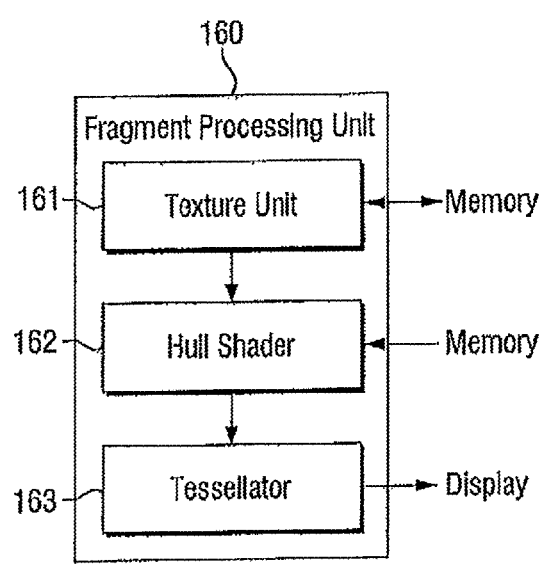
FIG. 5 is a block diagram showing a configuration of a fragment processing unit of FIG. 2.

Referring to FIG. 5, the fragment processing unit 160 includes a texture unit 161, a hull shader 162, and a tessellator 163.

The texture unit 161 may perform texturing and texture filtering. In expressing 3D, geographic objects are made, and textures are put thereon. The process of putting the textures on the objects is called texturing. Because such textures have the same resolution, the sizes of surfaces of a nearby object and a distant object may differ from each other, and widely or narrowly coloring the surfaces is called texture filtering.

When the temperature of the chip 10 is lower than the threshold temperature of the chip 10, the texture unit 161 may normally determine the texture level of detail. However, if the temperature of the chip 10 is equal to or higher than the threshold temperature, the texture level of detail may be reduced.

In some embodiments, rather than using only the threshold temperature to determine a reference, a plurality of temperature levels are used to change the texture level of detail according to the determined temperature levels.

The texture level of detail determines how many fragments are individually textured. Accordingly, if the texture level of detail is lowered, the number of operations of the GPU 100 may be reduced.

When the temperature of the chip 10 is lower than the threshold temperature of the chip 10, the texture unit 161 may determine the texture filtering in a predetermined mode. However, if the temperature of the chip 10 is equal to or higher than the threshold temperature, the texture filtering may be performed in another mode having a small number of operations.

The predetermined mode may be a tri-linear mode, and another mode may be a bi-linear mode or a nearest neighbor mode, but are not limited thereto.

During enlargement, the mode may generally be a nearest neighbor mode or a bi-linear mode.

The nearest neighbor mode is a mode in which pixel data of an extended portion during enlargement is complemented by using 100% of a neighboring pixel value.

The bi-linear mode is a mode in which the pixel of the extended portion during enlargement is complemented by mixing it with a nearby pixel. Since the pixel value is mixed with the neighboring pixel value, the spherical surface is smoothed and is expressed as pearly to give the surface a natural appearance.

During reduction, the mode may generally be a nearest neighbor no mipmaps mode, a bilinear no mipmaps mode, a nearest neighbor nearest mipmaps mode, a bilinear nearest mipmap mode, a nearest neighbor linear mipmap mode, or a trilinear mode.

During reduction, it is important to process the mipmap in which textures overlap each other in addition to the processing of the enlarged portion.

The nearest neighbor no mipmaps mode is a mode in which textures of an overlapping portion during reduction is processed in a nearest neighbor method. The bilinear no mipmaps mode is a mode in which the textures of the overlapping portion during reduction is processed in a bilinear method. The nearest neighbor nearest mipmaps mode is a mode in which the textures of the overlapping portion during reduction is processed in the nearest neighbor method, and one of pixels of a nearby portion between the mipmap in the next step and the mipmap in the current step is selected and processed in processing the mipmap. The bilinear nearest mipmap mode is a mode in which the texture of the overlapping portion during reduction is processed in the bilinear method, and the mipmap is processed in the nearest method. The nearest neighbor linear mipmap mode is a mode in which the textures of the overlapping portion during reduction is processed in the nearest neighbor method, and maps of the near positions of the current step and the next step are mixed to be used when the mipmap is processed. The trilinear mode is a mode in which in which the texture of the overlapping portion during reduction is processed in the bilinear method, and the mipmap is processed in the linear method.

Among the above-described modes, the trilinear mode requires the largest number of operations. Accordingly, if the temperature of the chip 10 is equal to or higher than the threshold temperature in the case where the texture unit 161 performs the texture filtering in the trilinear mode, the texture unit 161 may perform the texture filtering in another mode requiring a smaller number of operations. Furthermore, the temperature is not simply limited to the threshold temperature, but the mode can be adjusted with a plurality of levels according to the temperatures.

The texture level of detail determines how many fragments are individually textured. Accordingly, if the texture level of detail is lowered, the number of operations of the GPU 100 may be decreased.

When the temperature of the chip 10 is lower than the threshold temperature, the texture unit 161 may normally perform the texture filtering. However, if the temperature of the chip 10 is equal to or higher than the threshold temperature, the filtering ratio may be reduced.

In some embodiments, rather than using only the threshold temperature to determine a reference, a plurality of temperature levels are used to change the filtering ratio according to the determined temperature levels. Accordingly, the number of operations of the GPU 100 may be decreased according to the change of the reduction of the filtering ratio.

The hull shader 162 may receive information from the memory 200, which the texture unit 161 had previously output to the memory 200. The hull shader 162 may determine the tessellating level of detail. That is, the hull shader 162 may determine how many fragments the polygons on graphics are to be divided into. Specifically, the tessellating level of detail is to determine how many fragments to divide the polygons into.

The hull shader 162 may receive the updated GPU rendering quality state from the information that the rendering quality state machine 140 outputs to the memory 200. Accordingly, the hull shader 162 may determine the level of detail.

Because the hull shader 162 determines the level of detail through the updated GPU rendering quality state and the GPU rendering quality state is determined by the temperature, the level of detail of the hull shader 162 may differ depending on the temperature.

When the temperature is lower than the threshold temperature of the chip 10, the hull shader 162 can normally determine the level of detail. However, if the temperature is equal to or higher than the threshold temperature, the level of detail can be reduced.

Figure 6:
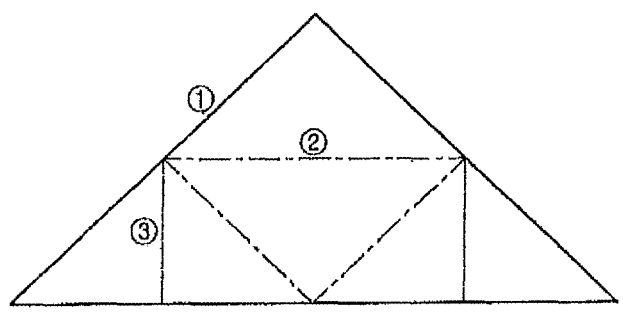
FIG. 6 is an example view showing a refinement pattern mode that is an input to a hull shader of FIG. 5.

FIG. 6 is an example view explaining a refinement pattern mode that enters as an input of a hull shader of FIG. 5.

The hull shader 162 receives an input of a refinement pattern mode. The refinement pattern mode is data that the vertex processing unit 110 stored in the memory 200. The refinement pattern mode may include a plurality of levels.

Referring to FIG. 6 illustrating triangles, the outmost triangle may be defined as a first level (1), and the inner inverted triangle may be defined as a second level (2). Furthermore, the vertically divided triangle may be defined as a third level (3). Specifically, the level may be defined according to the division degree of the triangle. However, the above-described explanation is merely an example, and the level definition is not limited thereto. The hull shader 162 may receive an input of the plurality of level values. For example, the hull shader 162 may receive information including the first level, second level and third level (1, 2, 3).

If the temperature sensed by the thermal sensor 300 is lower than the threshold temperature, the hull shader 162 may receive the refinement pattern mode, including information for each of the three levels (1, 2, 3). However, if the temperature is equal to or higher than the threshold temperature, the hull shader 162 may receive only the first level information of (1) among (1, 2, 3). In this case, the determination of the level of detail is limited to the level of (1), and thus the whole number of operations is reduced. Specifically, if the temperature is high, the number of operations can be reduced.

The number of operations may be reduced according to the threshold temperature, but is not limited thereto. The hull shader 162 may reduce the number of operations in the above-described method according to another temperature level that is not the threshold temperature.

In another embodiment of the present inventive concept, the hull shader 162 may determine a first-order level of detail regardless of the updated GPU rendering quality state that is related to the temperature of the chip 10.

Thus, if the temperature of the chip 10 is lower than the threshold temperature, the hull shader 162 may determine the first-order level of detail as the level of detail. If the temperature of the chip 10 is equal to or higher than the threshold temperature, the hull shader 162 may use either the preset maximum level of detail or the first-order level of detail having a smaller value, as the level of detail. The preset maximum level of detail may be a value that is set within a range of operation amount that can be performed by the chip 10.

Furthermore, if the temperature of the chip 10 is lower than the threshold temperature, the hull shader 162 may determine the first-order level of detail as the level of detail. If the temperature of the chip 10 is equal to or higher than the threshold temperature, the hull shader 162 may determine a value that is obtained by subtracting a reduction value from the first-order level of detail as the level of detail.

The reduction value may be predetermined, but is not limited thereto. The reduction value may be calculated and determined on the basis of a difference between the temperature of the chip 10 and the threshold temperature. In this case, it becomes possible to control the rendering quality more precisely and reliably.

Referring again to FIG. 5, the tessellator 163 may receive the level of detail from the hull shader 162. The tessellator 163 may perform tessellation on the basis of the level of detail.

The tessellation is to recognize and fill a portion in which hardware is not predetermined on the basis of the predetermined level of detail. Accordingly, forming of concavo-convexes can be implemented quite realistically. In this case, the level of detail means the degree of fine filling. Accordingly, if the level of detail becomes lowered, the operation amount of tessellation may be decreased.

Hereinafter, referring to FIG. 7 and FIG. 8, a computing system to which a method for controlling rendering quality according to another embodiment of the present inventive concept will be described. Details of the functional blocks including in the GPU 1100 and GPU 100 are described above.

Figure 7:
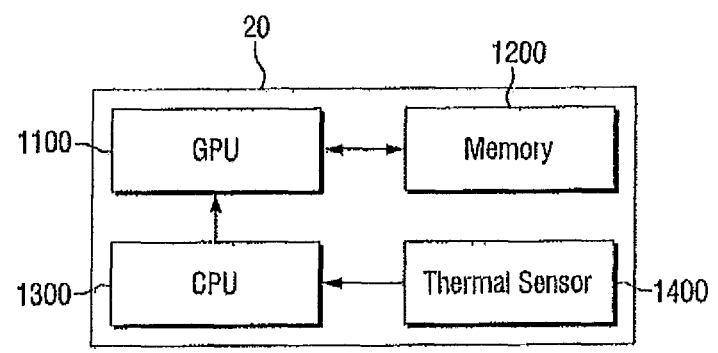
FIG. 7 is a block diagram showing a computing system for controlling rendering quality according to embodiment of the present inventive concept.

FIG. 7 is a block diagram explaining a computing system to which a method for controlling rendering quality according to another embodiment of the present inventive concept is applied.

Referring to FIG. 7, a computing system includes a graphics processing unit (GPU) 1100, a memory 1200, a central processing unit (CPU) 1300, and a thermal sensor 1400.

At least one of the GPU 1100, the memory 1200, the CPU 1300, and the thermal sensor 1400 may be positioned adjacent to either the GPU 1100, the memory 1200, the CPU 1300 or the thermal sensor 1400. For example, the GPU 1100, the memory 1200, the CPU 1300 and the thermal sensor 1400 may be positioned on one chip 20, but are not limited thereto. If the thermal sensor 1400 can sense the temperature of the chip 20 according to the operation of the GPU 1100, the positions of the GPU 1100, the CPU 1300, the memory 1200, and the thermal sensor 1400 are not specially limited.

The GPU 1100 is configured to perform tile-based rendering. To accomplish this, the GPU 1100 includes graphics pipeline configurations. The graphics pipeline may also be called a rendering pipeline. The graphics pipeline configurations can process graphic data in parallel. The graphics pipeline configurations may be configured by software or hardware.

The memory 1200 is configured to store data. The memory 1200 may store graphic data that is processed by the GPU 1100 or may store graphic data that is provided to the GPU 1100. Furthermore, the memory 1200 may serve as an operating memory of the GPU 1100. The memory 1200 may include at least one volatile memory, such as a DDR SDRAM (Double Data Rate Static DRAM) or SDR SDRAM (Single Data Rate SDRAM), or at least one nonvolatile memory, such as EEPROM (Electrical Erasable Programmable ROM) or a flash memory, or a combination of volatile and nonvolatile memories.

The CPU 1300 may transfer temperature information to the GPU 1100. In this case, the temperature may be updated with the GPU rendering quality state to be transferred. In addition, the CPU 1300 may transfer various commands to the GPU 1100. Specifically, the CPU 1300 may transfer commands, such as rendering and image loading, to the GPU 1100.

The thermal sensor 1400 may sense the temperature of the GPU 1100. The thermal sensor 1400 may be positioned on the chip 20. The thermal sensor 1400 may sense the temperature of the GPU 1100 as an indication of the temperature of the chip 20, and may transfer the sensed temperature to the GPU 1100. The thermal sensor 1400 may be an on-chip thermal sensor.

The thermal sensor 1400 may have a plurality of temperature levels. That is, the thermal sensor 1400 may determine which level the sensed temperature of the chip 20 belongs to among various predetermined temperature levels. The various levels may be a plurality of temperature levels. In this case, the thermal sensor 1400 may determine whether the temperature of the chip 20 belongs to the level that is equal to or higher than a threshold temperature of the chip 20.

The threshold temperature means an interrupt temperature of the chip 20. The interrupt temperature is a reference temperature at which reliability of the chip 20 deteriorates or the damage of the chip 20 has a substantial likelihood of occurring, and thus it is intended to stop the operation of the chip 20.

Figure 8:
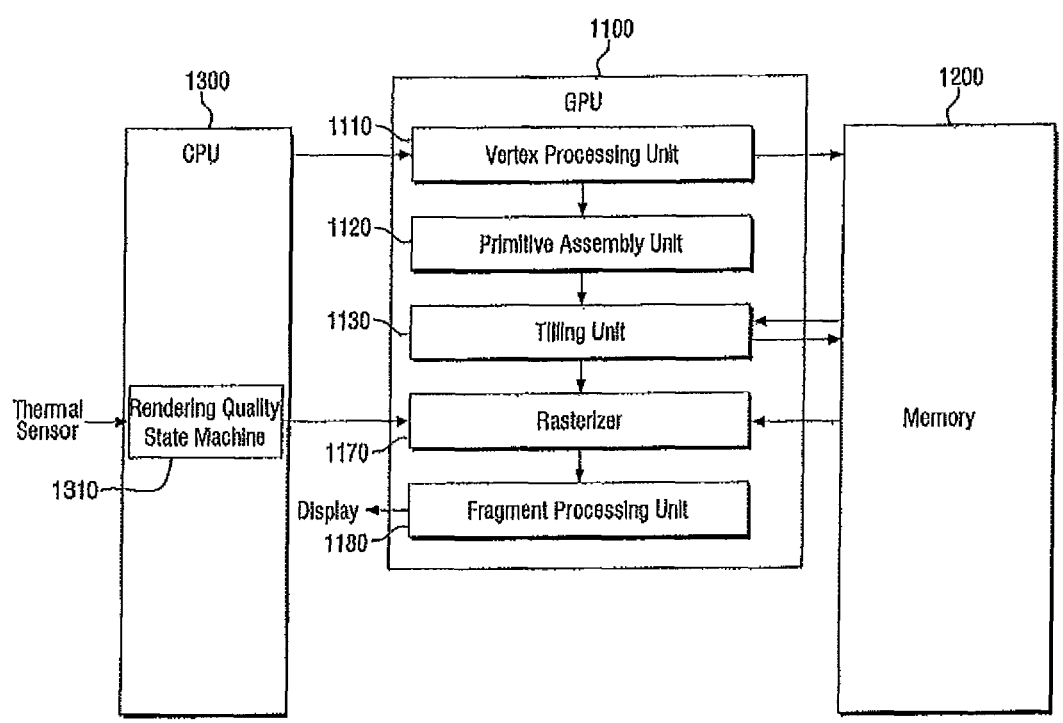
FIG. 8 is a block diagram showing a configuration of a graphics pipeline of a graphics processing unit of FIG. 7.

FIG. 8 is a block diagram explaining the detailed configuration of a graphics pipeline of a GPU of FIG. 7.

Referring to FIG. 8, the CPU 1300 includes a rendering quality state machine 1310. The rendering quality state machine 1310 receives the temperature from the thermal sensor 1400 to determine the rendering quality. In the above-described embodiment of a GPU 100 (see FIG. 2), the rendering quality state machine 1310 is inside the GPU 100, whereas in this embodiment of a GPU 1100, the rendering quality state machine 1310 may be positioned in the CPU 1300.

The rendering quality state machine 1310 may determine the rendering quality through the temperature, and may update the GPU rendering quality state of the GPU 1100.

The rendering quality state machine 1310 may transfer the temperature or the GPU rendering quality state to the hull shader 162 included in the Fragment Processing Unit 1160 to determine the tessellating level of detail.

Referring to FIG. 8, the GPU 1100 includes a vertex processing unit 1110, a primitive assembly unit 1120, a tiling unit 1130, a rasterizer 1150, and a fragment processing unit 1160.

The GPU 1100 may control the rendering quality according to the updated GPU rendering quality state. Specifically, the GPU 1100 may perform the rendering through adjustment of at least one of a tessellating level of detail, a texturing level of detail, resolution of a frame buffer object, an extended multiple of anti-aliasing, a texture filtering mode, and a filtering ratio of texture filtering.

The computer system according to the method for controlling rendering quality according to an embodiment of the present inventive concept controls the rendering quality using the temperature. The rendering quality is an element that determines the graphic quality. Accordingly, in the case where the performance of the GPU 1100 is supported, there is no problem even if the rendering quality is high. However, in the case where the performance of the GPU 1100 is not good, the frame per second (FPS), that is, the frame rate, becomes low if the rendering quality is high.

If the frame rate is lowered, disconnection of an image that a user is viewing may occur. This may be perceived by the user as a fatal picture quality problem that is more severe than that of the rendering quality. In order to prevent such a problem, the computing system, lowers the rendering quality to recover the frame rate. However, because this problem occurs only when the number of operations of the GPU 1100 exceeds the performance range, the rendering quality may be determined by sensing this operating problem through measurement of the temperature of the GPU 1100.

Hereinafter, referring to FIG. 1, FIG. 2, and FIG. 9, a method for controlling rendering quality according to an embodiment of the present inventive concept will be described.

Figure 9:
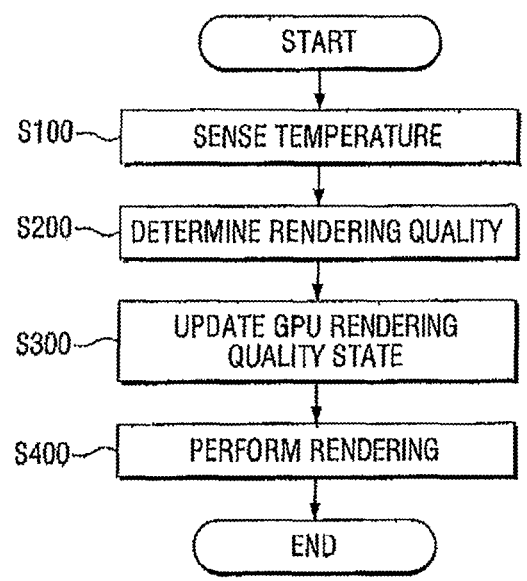
FIG. 9 is a flowchart showing a method for controlling rendering quality according to an embodiment of the present inventive concept.

Referring to FIG. 9, according to the method for controlling rendering quality according to an embodiment of the present inventive concept, the temperature of the GPU 100 is first sensed at step S100.

Specifically, referring to FIG. 1, the temperature may be sensed by the thermal sensor 300. The thermal sensor may be an on-chip thermal sensor. Sensing the temperature may include determining which level the sensed temperature belongs to among at least one predetermined temperature level. Levels according to various temperature ranges may be predetermined, and the thermal sensor may be output which level the measured temperature belongs to corresponding to the predetermined temperature levels.

Referring again to FIG. 9, the rendering quality is determined at step S200.

Specifically, referring to FIG. 2, the rendering quality may be determined by the rendering quality state machine 140.

The rendering quality state machine 140 may receive the temperature or the level of the measured temperature to determine the corresponding rendering quality. In this case, the rendering quality may be lowered as the temperature becomes high. That is, as the temperature is increased, the rendering quality may be determined to be lowered to reduce the number of operations.

Referring again to FIG. 9, the GPU rendering quality state is updated at step S300.

Specifically, referring to FIG. 2, the GPU rendering quality state may be updated by the rendering quality state machine 140.

The rendering quality state machine 140 updates the GPU rendering quality state according to the determined rendering quality. The GPU rendering quality state may be adjusted for of at least one of the tessellating level of detail, the texturing level of detail, the resolution of the frame buffer object, the extended multiple of the anti-aliasing, the texture filtering mode, and the filtering ratio of the texture filtering. The adjustment of the above-described elements may be performed by the rendering quality state machine 140, and may be determined by each individual rendering unit. The rendering unit may be the hull shader 162, the tessellator 163, and the rasterizer 150.

Referring again to FIG. 9, the rendering is performed at step S400.

Specifically, referring to FIG. 2, the GPU 100 may perform the rendering. In this case, the rendering may be performed by adjusting at least one of the tessellating level of detail, the texturing level of detail, the resolution of the frame buffer object, the extended multiple of the anti-aliasing, the texture filtering mode, and the filtering ratio of the texture filtering according to the updated GPU rendering quality.

Hereinafter, referring to FIG. 2 and FIG. 10, the rendering in FIG. 9 will be described in detail.

Figure 10:
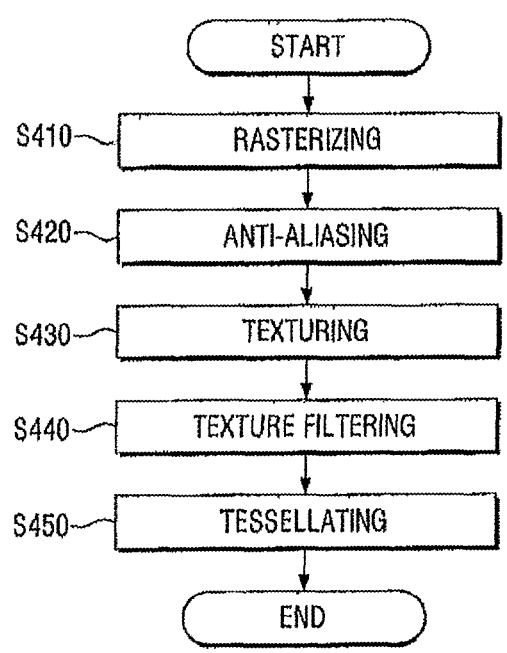
FIG. 10 is a flowchart showing a rendering step of FIG. 9.

Referring to FIG. 10, rasterizing is performed at step S410.

Rasterizing means to convert a primitive that is vector information into a raster image, that is, a pixel. Referring to FIG. 2, the GPU 100 includes the rasterizer 150, which may perform the rasterizing.

Referring to FIG. 9 and FIG. 10, anti-aliasing is performed at step S420.

Anti-aliasing means to prevent the occurrence of an aliasing phenomenon that shows the stair-step shape due to the limit of resolution when an image is enlarged. Specifically, the anti-aliasing converts the stair-step shape of the rasterized image into a smooth straight-line shape. Referring to FIG. 2, the rasterizer 150 may perform the anti-aliasing.

Referring again to FIG. 9, texturing is performed (S430).

In expressing 3D, geographic objects are made, and textures are put thereon. Such a process of putting the textures on the objects is called texturing. Referring to FIG. 2, the texture unit 161 may perform the texturing. Texture filtering is performed at step S440.

Through texturing, all textures have the same resolution, and because the sizes of surfaces of a nearby object and a distant object may differ from each other, widely or narrowly coloring the surfaces is called the texture filtering. Referring to FIG. 2 and FIG. 5, the texture unit 161 may perform the texture filtering. Tessellation is performed at step S450.

Tessellation recognizes and fills a portion in which hardware is not predetermined on the basis of the predetermined level of detail. Accordingly, forming of concavo-convexes can be implemented quite realistically. In this case, the level of detail means the degree of fine filling. Referring to FIG. 2 and FIG. 5, the graphics processing unit 100 may include the tessellator 163, which performs the tessellation.

Hereinafter, referring to FIG. 1, FIG. 2, and FIG. 11, the anti-aliasing will be described in detail.

Figure 11:
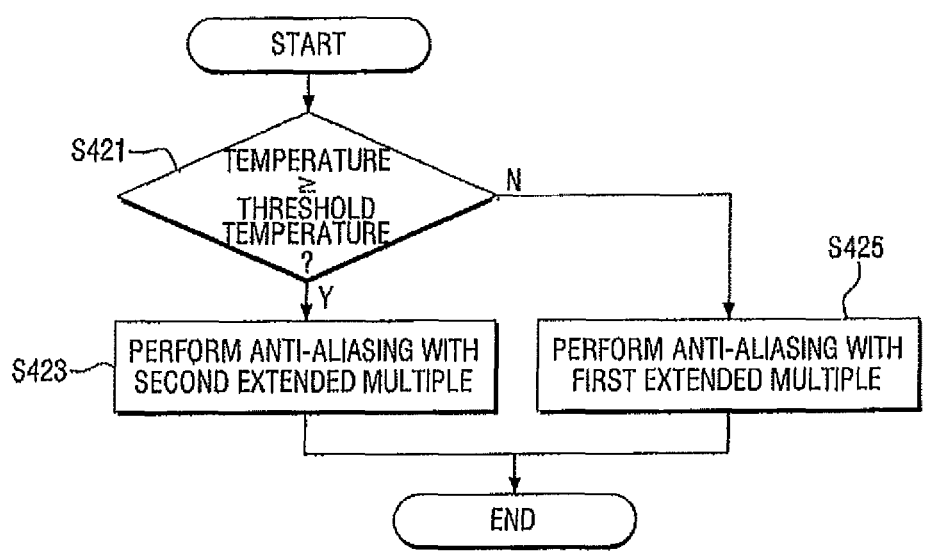
FIG. 11 is a flowchart showing an anti-aliasing step of FIG. 10.

Referring to FIG. 11, it is first determined whether the temperature of the chip is higher than the threshold temperature at step S421.

Specifically, referring to FIG. 1 and FIG. 2, the temperature may be measured by the thermal sensor 300, and the temperature information may be updated as the GPU rendering quality state.

If the temperature is lower than the threshold temperature, the anti-aliasing may be performed with a first extended multiple at step S423. If the temperature is equal to or higher than the threshold temperature, the anti-aliasing may be performed with a second extended multiple at step S425. The second extended multiple is smaller than the first extended multiple. Specifically, if the temperature of the chip 10 is higher than the threshold temperature, the anti-aliasing may be performed with a smaller extended multiple.

Furthermore, it is not a limit that the extended multiple be adjusted only in the case where the temperature is higher than the threshold temperature. The temperature may belong to any one of a plurality of levels, and the anti-aliasing may be performed with the corresponding extended multiple according to the plurality of levels.

Hereinafter, referring to FIG. 1, FIG. 2, and FIG. 12, the texturing will be described in detail.

Figure 12:
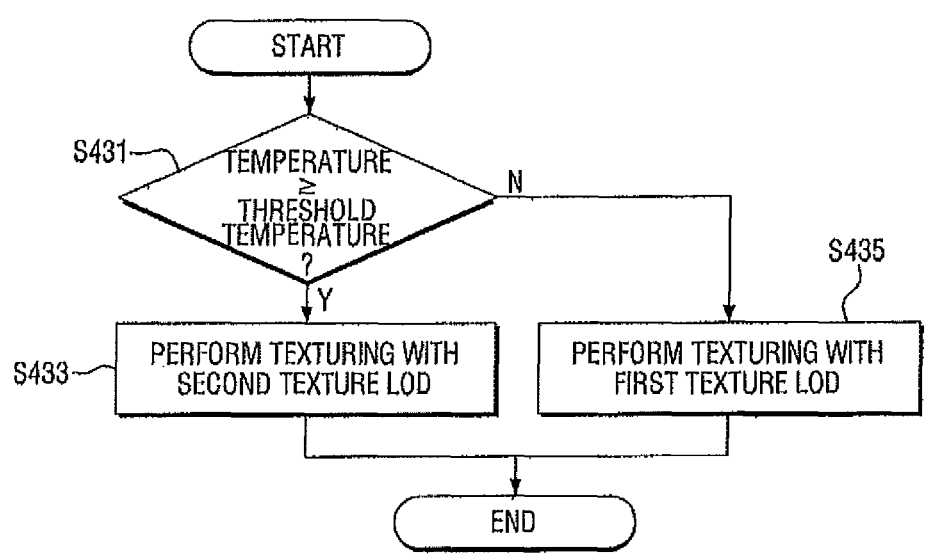
FIG. 12 is a flowchart showing a texturing step of FIG. 10.

Referring to FIG. 12, it is first determined whether the temperature of the chip is higher than the threshold temperature at step S431.

Specifically, referring to FIG. 1 and FIG. 2, the temperature may be measured by the thermal sensor 300, and the temperature information may be updated as the GPU rendering quality state.

If the temperature is lower than the threshold temperature, the texturing may be performed with a first texture level of detail at step S433. If the temperature is equal to or higher than the threshold temperature, the texturing may be performed with a second texture level of detail at step S435. The second texture level of detail is lower than the first texture level of detail. That is, if the temperature of the chip 10 is higher than the threshold temperature, the texturing may be performed with a lower texture level of detail.

Furthermore, it is not a limit that the texture level of detail be adjusted only in the case where the temperature is higher than the threshold temperature. The temperature may belong to any one of a plurality of levels, and the texturing may be performed with the corresponding texture level of detail according to the plurality of levels.

Hereinafter, referring to FIG. 1, FIG. 2, and FIG. 13, the texture filtering will be described in detail.

Figure 13:
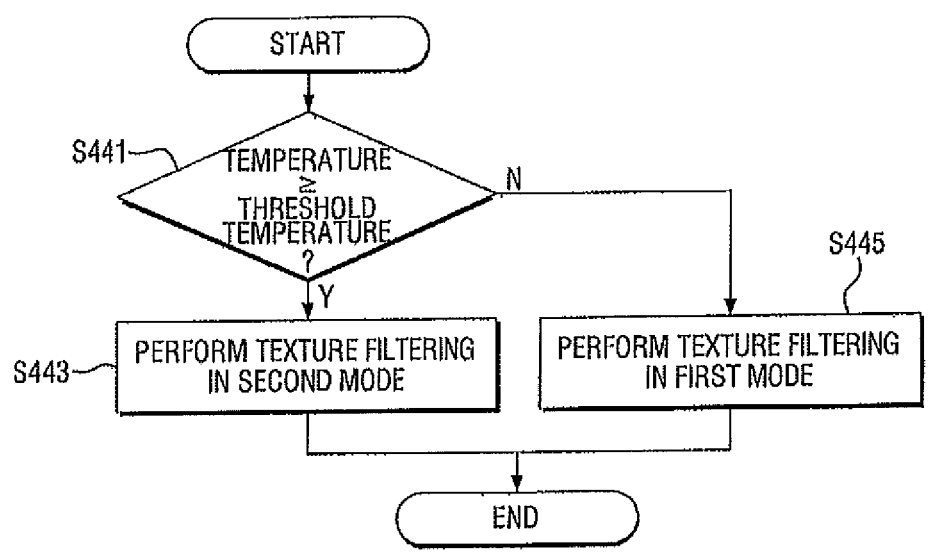
FIG. 13 is a flowchart showing a texture filtering step of FIG. 10.

Referring to FIG. 13, it is first determined whether the temperature of the chip is higher than the threshold temperature at step S441.

Specifically, referring to FIG. 1 and FIG. 2, the temperature may be measured by the thermal sensor 300, and the temperature information may be updated as the GPU rendering quality state.

If the temperature is lower than the threshold temperature, the texture filtering may be performed in a first mode at step S443. If the temperature is equal to or higher than the threshold temperature, the texture filtering may be performed in a second mode at step S445. The operation amount in the second mode may be smaller than the operation amount in the first mode. That is, if the temperature of the chip 10 is higher than the threshold temperature, the texture filtering may be performed with a smaller operation amount in the mode.

Furthermore, it is not a limit that the mode be adjusted only in the case where the temperature is higher than the threshold temperature. That is, the temperature may belong to any one of a plurality of levels, and the texture filtering may be performed in the corresponding mode according to the plurality of levels.

The first mode may be a tri-linear mode, and the second mode may be a bi-linear mode or a nearest neighbor mode, but are not limited thereto.

During enlargement, the mode may generally be a nearest neighbor mode or a bi-linear mode.

The nearest neighbor mode is a mode in which pixel data of an extended portion during enlargement is complemented by using 100% of a neighboring pixel value.

The hi-linear mode is a mode in which the pixel of the extended portion during enlargement is complemented by mixing it with a nearby pixel. Since the pixel value is mixed with the neighboring pixel value, the spherical surface shows smooth and is expressed pearly to be natural.

During reduction, the mode may generally be a nearest neighbor no mipmaps mode, a bilinear no mipmaps mode, a nearest neighbor nearest mipmaps mode, a bilinear nearest mipmap mode, a nearest neighbor linear mipmap mode, or a trilinear mode.

During reduction, it is important to process the mipmap in which textures overlap each other in addition to the processing of the enlarged portion.

The nearest neighbor no mipmaps mode is a mode in which textures of an overlapping portion during reduction is processed in a nearest neighbor method. The bilinear no mipmaps mode is a mode in which the textures of the overlapping portion during reduction is processed in a bilinear method. The nearest neighbor nearest mipmaps mode is a mode in which the textures of the overlapping portion during reduction is processed in the nearest neighbor method, and one of the pixels of a nearby portion between the mipmap in the next step and the mipmap in the current step is selected and processed in processing the mipmap. The bilinear nearest mipmap mode is a mode in which the texture of the overlapping portion during reduction is processed in the bilinear method, and the mipmap is processed in the nearest method. The nearest neighbor linear mipmap mode is a mode in which the textures of the overlapping portion during reduction is processed in the nearest neighbor method, and maps of the near positions of the current step and the next stop are mixed to be used when the mipmap is processed. The trilinear mode is a mode in which in which the texture of the overlapping portion during reduction is processed in the bilinear method, and the mipmap is processed in the linear method.

Among the above-described modes, the trilinear mode requires the largest number of operations. Accordingly, the first mode may be a trilinear mode, and the second mode may be another mode, such as a bilinear mode or a nearest neighbor no mipmaps mode.

Hereinafter, referring to FIG. 1, FIG. 2, and FIG. 14, the tessellation will be described in detail.

Figure 14:
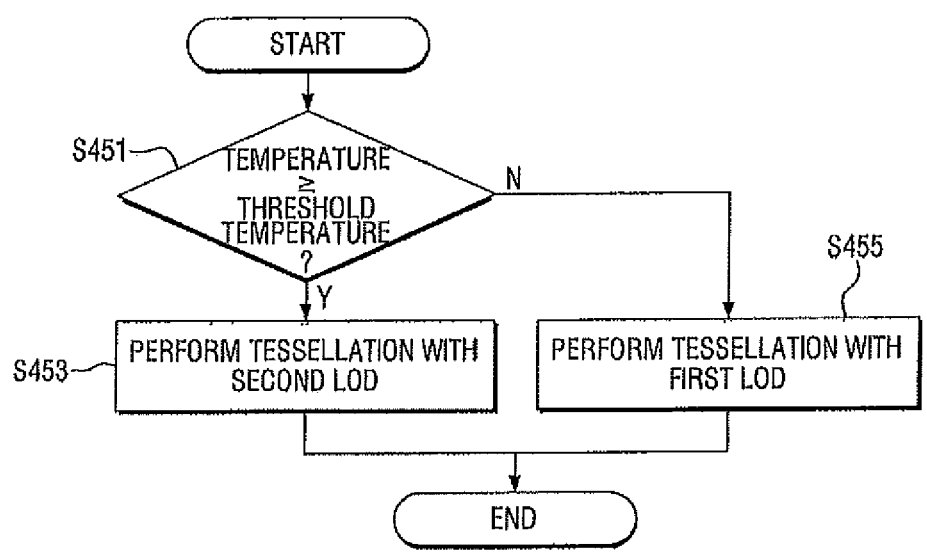
FIG. 14 is a flowchart showing a tessellation step of FIG. 10.

Referring to FIG. 14, it is first determined whether the temperature of the chip is higher than the threshold temperature at step S451.

Specifically, referring to FIG. 1 and FIG. 2, the temperature may be measured by the thermal sensor 300, and the temperature information may be updated as the graphics processing unit rendering quality state.

If the temperature is lower than the threshold temperature, the tessellation may be performed with a first level of detail at step S453. If the temperature is equal to or higher than the threshold temperature, the tessellation may be performed with a second level of detail at step S455. The second level of detail is lower than the first level of detail. That is, if the temperature of the chip 10 is higher than the threshold temperature, the tessellation may be performed with a lower level of detail.

Furthermore, it is not a limit that the level of detail be adjusted only in the case where the temperature is higher than the threshold temperature. That is, the temperature may belong to any one of a plurality of levels, and the tessellation may be performed with the corresponding level of detail according to the plurality of levels.

In FIG. 11 through FIG. 14, the steps of comparing the temperature with the threshold temperature may be entirely united into one step. That is, the comparison and determination of the temperature levels may be performed only once, and the rendering may be applied according to the results in the respective steps. Furthermore, the steps of adjusting the rendering quality according to the temperature may be performed in parallel, or a part thereof is omitted and only the remainder may be performed.

Hereinafter, referring to FIG. 1, FIG. 2, and FIG. 15, a method for controlling rendering quality according to another embodiment of the present inventive concept will be described.

Figure 15:
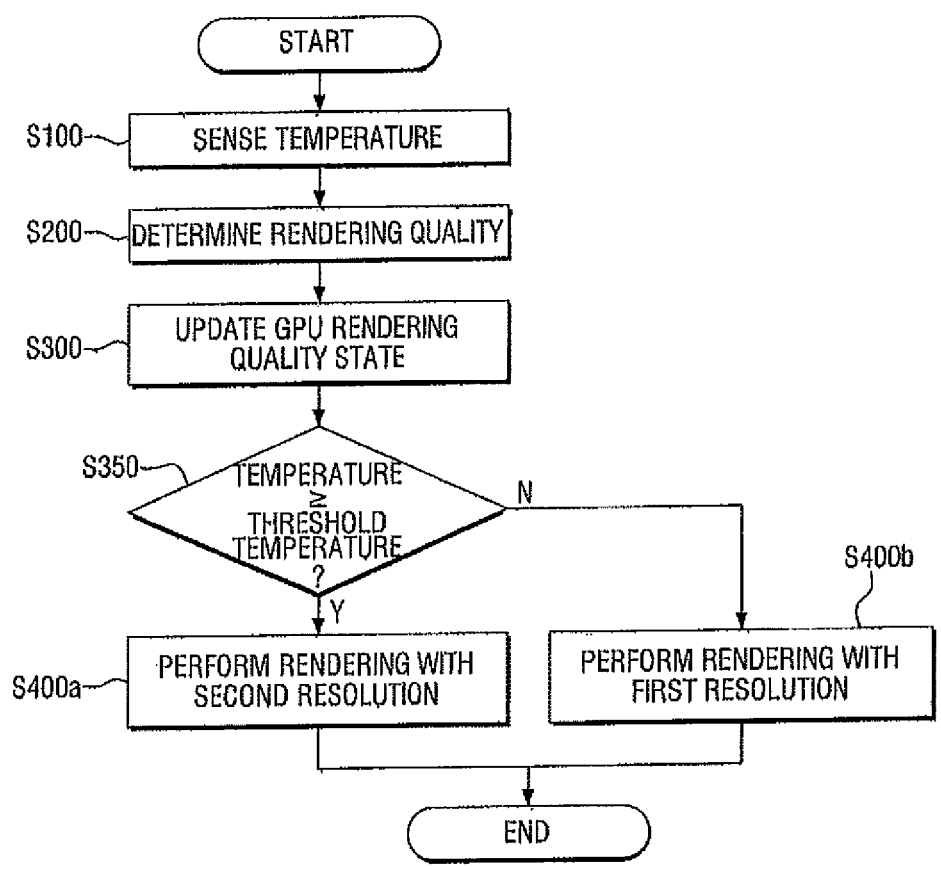
FIG. 15 is a flowchart showing a method for controlling rendering quality according to an embodiment of the present inventive concept.

Referring to FIG. 15, after the GPU rendering quality state updating step at step S300, it is determined whether the temperature of the chip is higher than the threshold temperature at step S350.

Specifically, referring to FIG. 1 and FIG. 2, the temperature may be measured by the thermal sensor 300, and the temperature information may be updated as the GPU rendering quality state.

If the temperature is lower than the threshold temperature, the rendering may be performed with a first resolution at step S400*a*. If the temperature is equal to or higher than the threshold temperature, the rendering may be performed with a second resolution at step S400*b*. The second resolution is lower than the first resolution. Specifically, if the temperature of the chip 10 is higher than the threshold temperature, the rendering may be performed with a lower resolution.

Furthermore, it is not a limit that the resolution be adjusted only in the case where the temperature is higher than the threshold temperature. The temperature may belong to any one of a plurality of levels, and the rendering may be performed in the corresponding model according to the plurality of levels.

According to the method for controlling the rendering quality according to the embodiments of the present inventive concept, the rendering quality is determined on the basis of the temperature, and thus an interrupt according to the frame rate and the temperature is prevented to improve user experience.

Figure 16:
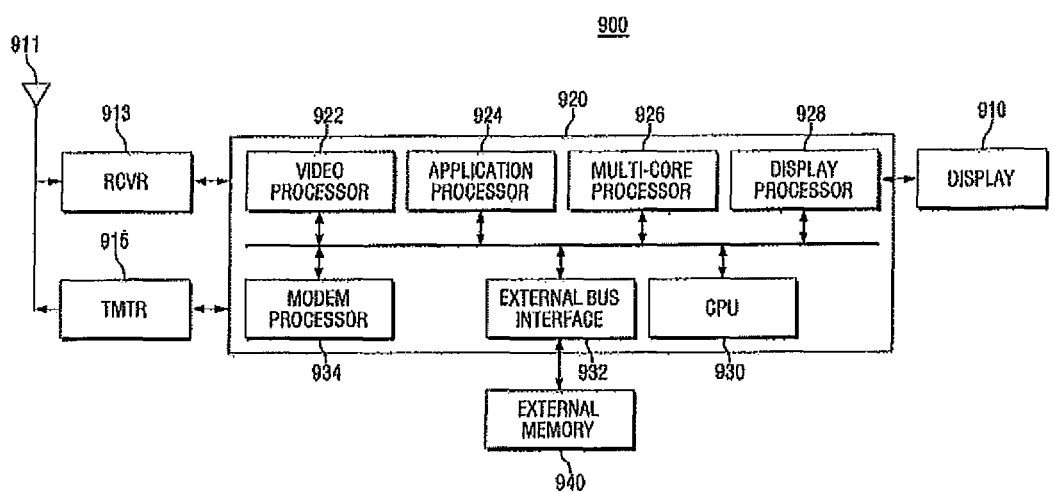
FIG. 16 is a block diagram illustrating a wireless communication device that includes a GPU using a method for controlling rendering quality according to embodiments of the present inventive concept.

Referring to FIG. 16, a device 900 may be a cellular phone, a smart phone terminal, a handset, a personal digital assistant (PDA), a laptop computer, a video game unit, or other devices. The device 900 may use code division multiple access (CDMA), time division multiple access (TDMA), such as a global system GSM for mobile communication, or other wireless communication standards.

The device 900 may provide bi-directional communication through a reception path and a transmission path. Signals transmitted by one or more base stations on the reception path may be received through an antenna 911 or may be provided to a receiver (RCVR) 913. The receiver 913 may perform conditioning and digitalization of a received signal and provide samples to a digital section 920 for additional processing. On the transmission path, a transmitter (TMTR) 915 may receive data transmitted from the digital section 920, perform processing and conditioning of the data, and generate a modulated signal. The modulated signal may be transmitted to one or more base stations through the antenna 911.

The digital section 920 may be implemented by one or more digital signal processors (DSP), a microprocessor, and a reduced instruction set computer (RISC). Further, the digital section 920 may be fabricated on one or more application-specific integrated circuits (ASIC) or other types of integrated circuits (IC).

The digital section 920 may include, for example, various processing and interface units, such as a modem processor 934, a video processor 922, an application processor 924, a display processor 928, a controller/multi-core processor 926, a CPU 930, and an external bus interface (EBI) 932.

The video processor 922 may perform processing of graphic applications, and may adopt the GPU 100 or GPU 1100 according to the embodiments of the present inventive concept. In general, the video processor 922 may include a certain number of processing units or modules for a certain set of graphic operations. A specific part of the video processor 922 may be implemented by firmware or software. For example, the control unit may be implemented by firmware or software modules (e.g., procedures or functions) for performing the above-described functions. Firmware or software codes may be stored in a memory (e.g., memory 200 in FIG. 1), or may be executed by a processor (e.g., the multi-core processor 926). The memory may be contained within the processor or be separate from the processor.

The video processor 922 may implement a software interface, such as open graphic library (OpenGL) or Direct3D. The CPU 930 may perform a series of graphic processing operations together with the video processor 922. The controller/multi-core processor 926 may include at least two cores, and allocate work-loads to each of the at least two cores depending on the work loads, which the controller/multi-core processor 926 is to process, to process the corresponding work loads at the same time.

Figure 17:
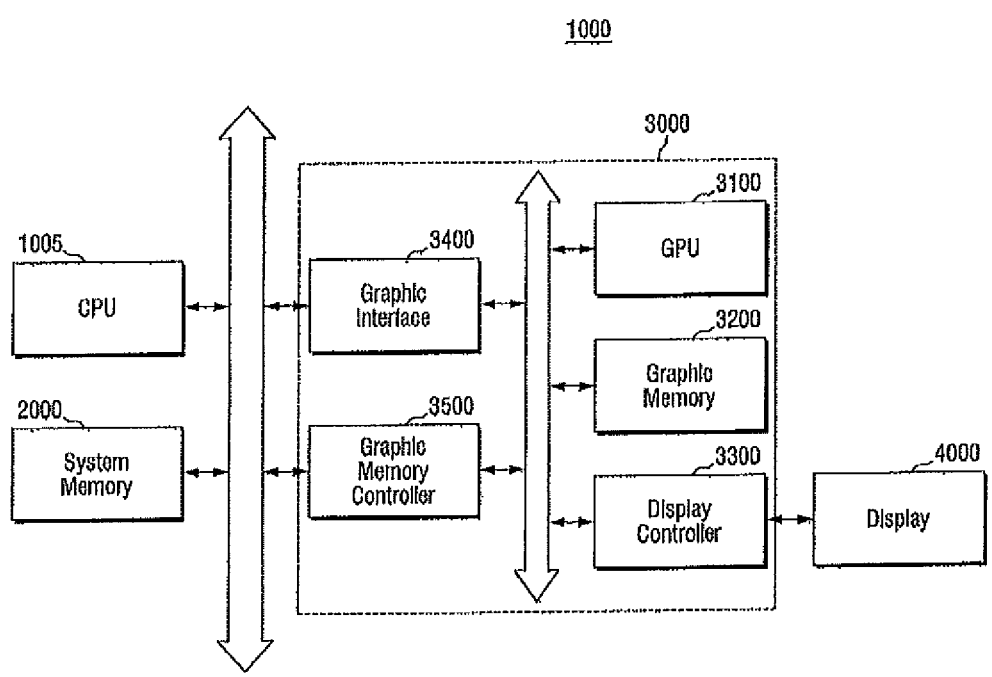
FIG. 17 is a block diagram illustrating a computing unit including a GPU that uses a method for controlling rendering quality according to embodiments of the present inventive concept.

Referring to FIG. 17, a computing system 100Q according to an embodiment of the present inventive concept includes a CPU 1005, a system memory 2000, a sub-graphic system 3000, and a display 4000.

The CPU 1005 is configured to generate a mesh through driving of an application. The mesh may describe the surface of an object. The mesh may be composed of a plurality of primitives, and the primitive may be composed of at least one vertex.

The system memory 2000 is configured to store data. The system memory 2000 may store data that is processed by the CPU 1005. The system memory 2000 may be configured to store data. The system memory 2000 may store data that is processed by the CPU 1005. The system memory 2000 may serve as an operating memory of the CPU 1005. The system memory 2000 may include one or more volatile memories, such as a DDR SDRAM (Double Data Rate Static DRAM) and SDR SDRAM (Single Data Rate SDRAM), or one or more nonvolatile memories, such as EEPROM (Electrical Erasable Programmable ROM), and a flash memory, or a combination of volatile and nonvolatile memories.

The sub-graphic system 3000 may include a GPU 3100, a graphic memory 3200, a display controller 3300, a graphic interface 3400, and a graphic memory controller 3500.

The GPU 3100 may be configured substantially in the same manner as the GPU 100 or GPU 1100 according to the embodiments of the present inventive concept as described above. The GPU 3100 may perform tile-based rendering by using a plurality of primitives that constitute the mesh. The GPU 3100 may receive an input of data of the vertexes that constitute the mesh from the CPU 1005. The GPU 3100 may assemble the primitives including at least one vertex and may perform the rendering using the assembled primitives.

The graphic memory 3200 may store graphic data that is processed by the GPU 3100 or graphic data provided to the GPU 3100. Furthermore, the graphic memory 3200 may serve as an operating memory of the GPU 3100.

The display controller 3300 may control the display 4000 to display rendered image frames.

The graphic interface 3400 may perform interfacing between the CPU 1005 and the GPU 3100, and the graphic memory controller 3500 may provide a memory access between the system memory 2000 and the GPU 3100.

The computing system 1000 may further include one or more input devices, such as buttons, a touch screen, and a microphone and/or one or more output devices, such as speakers (not shown). Furthermore, the computing system 1000 may further include an interface device for exchanging data with an external device by wired or wireless communication. The interface device may include, for example, an antenna or a wire/wireless transceiver.

According to embodiments, the computing system 1000 may be a certain computing system, such as a mobile phone, a smart phone, a personal digital assistant (PDA), a desktop computer, a notebook computer, or a tablet.

The method explained in relation to the embodiments of the present inventive concept or steps of an algorithm may be directly implemented by a hardware module, a software module, or a combination thereof, which may be executed by a processor. The software module may reside in a RAM memory, a flash memory, a ROM memory, an EPROM memory, an EEPROM memory, a register, a hard disk, a detachable disk, a CD-ROM, or a certain computer-readable recording medium that is well known in the technical field to which the present inventive concept pertains. An example recording medium may be connected to a processor, and the processor may read information from the recording medium or write information in the recording medium. As another method, the recording medium may be integrally formed with the processor. The processor and the recording medium may reside in an application-specific integrated circuit (ASIC). The ASIC may reside in a user terminal. As another method, the processor and the recording medium may reside as individual constituent elements in the user terminal.

Although preferred embodiments of the present inventive concept have been described for illustrative purposes, those skilled in the art will appreciate that various modifications, additions and substitutions are possible, without departing from the scope and spirit of the invention as disclosed in the accompanying claims.

While the present inventive concept has been particularly shown and described with reference to example embodiments thereof, it will be understood by those of ordinary skill in the art that various changes in form and details may be made therein without departing from the spirit and scope of the present inventive concept as defined by the following claims. It is therefore desired that the present embodiments be considered in all respects as illustrative and not restrictive, reference being made to the appended claims rather than the foregoing description to indicate the scope of the invention.

What is claimed is:

1. A method for controlling rendering quality, comprising:
   sensing a temperature of a chip by a thermal sensor;
   determining a level of detail (LOD) by a hull shader, the
      LOD based on the temperature; and tessellating segments by a tessellator, the segments divided according to the level of detail, wherein an input signal of the hull shader includes a plurality of levels divided according to a size with which the segments are divided, and determining the level of detail comprises the hull shader receiving an input of all the plurality of levels if the temperature is lower than a threshold temperature, and receiving only the level with which the divided segment is largest among the plurality of levels if the temperature is equal to or higher than the threshold temperature.

2. The method of claim 1, wherein sensing the temperature of the chip comprises determining which of at least one predetermined level the sensed temperature belongs to.

3. The method of claim 2, wherein sensing the temperature of the chip comprises determining whether the temperature of the chip belongs to a level that is equal to or higher than a threshold temperature value of the chip.

4. The method of claim 1, wherein the determining the level of detail comprises:

determining by the hull shader, a first-order level of detail; and determining the first-order level of detail as the level of detail if the temperature is lower than a threshold temperature, and determining one of a preset maximum level of detail and the first-order level of detail, which has a smaller value than the value of the preset maximum level of detail, as the level of detail if the temperature is equal to or higher than the threshold temperature.

5. The method of claim 1, further comprising rendering by a graphics processing unit, the rendering based on the temperature and comprising performing tessellation based on a first level of detail if the temperature is lower than a threshold temperature, and performing tessellation based on a second level of detail that is lower than the first level of detail if the temperature is equal to or higher than the threshold temperature.

6. The method of claim 1, further comprising rendering by a graphics processing unit, the rendering based on the temperature and comprising performing texturing based on a first texture level of detail if the temperature is lower than a threshold temperature, and performing texturing based on a second texture level of detail that is lower than the first texture level of detail if the temperature is equal to or higher than the threshold temperature.

7. The method of claim 1, further comprising rendering by a graphics processing unit, the rendering based on the temperature and comprising s performing the rendering with a first resolution if the temperature is lower than a threshold temperature, and performing the rendering with a second resolution that is lower than the first resolution if the temperature is equal to or higher than the threshold temperature.

8. The method of claim 1, further comprising rendering by a graphics processing unit, the rendering based on the temperature and comprising performing anti-aliasing (AA) with a first extended multiple if the temperature is lower than a threshold temperature, and performing the anti-aliasing (AA) with a second extended multiple that is smaller than the first extended multiple if the temperature is equal to or higher than the threshold temperature.

9. The method of claim 1, further comprising rendering by a graphics processing unit, the rendering based on the temperature and comprising performing texture filtering in a first mode if the temperature is lower than a threshold temperature, and performing the texture filtering in a second mode in which an operation amount is smaller than an operation amount in the first mode if the temperature is equal to or higher than the threshold temperature.

10. A device for controlling rendering quality comprising:

a central processing unit (CPU) configured to generate a mesh describing the surface of a three-dimensional (3D) object, the mesh comprising a plurality of primitives, wherein each primitive includes at least one vertex; and a sub-graphic system configured to receive the mesh from the CPU, and to render a display of a 3D object from the mesh, a rendering quality of the display being determined by at least a temperature measurement provided to a rendering quality state machine, the rendering quality state machine further comprising:

a hull shader configured to deteimine a level of detail based on the temperature measurement and, a tessellator configured to tessellate segments that are divided according to the level of detail, wherein deteimining the level of detail comprises the hull shader determining a first-order level of detail as the level of detail if the temperature measurement is lower than a threshold temperature, and determining the level of detail as a value that is obtained by subtracting a reduction value from the first-order level of detail if the temperature measurement is equal to or higher than the threshold temperature, the reduction value is predetermined by a difference between the temperature measurement and the threshold temperature.

11. The device of claim 10 wherein the rendering quality state machine is included in the sub-graphic system.

12. The device of claim 10 wherein the rendering quality state machine is included in the CPU.

13. The device of claim 10 wherein the rendering quality of the display is determined by at least one of a tessellating level of detail, a texturing level of detail, a frame buffer resolution, an extended multiple of anti-aliasing, a texture filtering mode and a filtering ratio.

14. The device of claim 10 wherein the display of the 3D object includes a plurality of fragments, each fragment including a texture and a shading.

15. A method for controlling rendering quality, comprising:

sensing a temperature of a chip by a thermal sensor;

determining a level of detail (LOD) by a hull shader, the LOD based on the temperature; and tessellating segments by a tessellator, the segments divided according to the level of detail, wherein determining the level of detail comprises the hull shader determining a first-order level of detail as the level of detail if the temperature is lower than a threshold temperature, and determining the level of detail as a value that is obtained by subtracting a reduction value from the first-order level of detail if the temperature is equal to or higher than the threshold temperature, the reduction value is predetermined by a difference between the temperature and the threshold temperature.

16. The method of claim 15 further comprising rendering by a graphics processing unit, the rendering based on the temperature and comprising performing tessellation based on a first level of detail if the temperature is lower than a threshold temperature, and performing tessellation based on a second level of detail that is lower than the first level of detail if the temperature is equal to or higher than the threshold temperature.

17. The method of claim 15, further comprising rendering by a graphics processing unit, the rendering based on the temperature and comprising performing texturing based on a first texture level of detail if the temperature is lower than a threshold temperature, and performing texturing based on a second texture level of detail that is lower than the first texture level of detail if the temperature is equal to or higher than the threshold temperature.

18. The method of claim 15, further comprising rendering by a graphics processing unit, the rendering based on the temperature and comprising performing the rendering with a first resolution if the temperature is lower than a threshold temperature, and performing the rendering with a second resolution that is lower than the first resolution if the temperature is equal to or higher than the threshold temperature.

19. The method of claim 15, further comprising rendering by a graphics processing unit, the rendering based on the temperature and comprising perfoiming anti-aliasing (AA) with a first extended multiple if the temperature is lower than a threshold temperature, and performing the anti-aliasing (AA) with a second extended multiple that is smaller than the first extended multiple if the temperature is equal to or higher than the threshold temperature.

20. The method of claim 15, further comprising rendering by a graphics processing unit, the rendering based on the temperature and comprising performing texture filtering in a first mode if the temperature is lower than a threshold temperature, and performing the texture filtering in a second mode in which an operation amount is smaller than an operation amount in the first mode if the temperature is equal to or higher than the threshold temperature.

\* \* \* \* \*